United States Patent [19]

Sullivan et al.

[11] Patent Number: 5,214,517
[45] Date of Patent: May 25, 1993

[54] DIGITAL HALFTONING WITH CORRELATED MINIMUM VISUAL MODULATION PATTERNS

[75] Inventors: James R. Sullivan, Spencerport; Lawrence A. Ray, Rochester, both of N.Y.

[73] Assignee: Eastman Kodak Company, Rochester, N.Y.

[21] Appl. No.: 531,266

[22] Filed: May 29, 1990

Related U.S. Application Data

[63] Continuation-in-part of Ser. No. 476,090, Feb. 7, 1990, abandoned.

[51] Int. Cl.$^5$ .............................................. H04N 1/40
[52] U.S. Cl. ................... 358/456; 358/429; 358/463; 358/448
[58] Field of Search ............... 358/463, 429, 456, 444, 358/448, 455, 457, 458, 459, 461, 464, 465, 466; 382/50, 52, 56; 364/602

[56] References Cited

U.S. PATENT DOCUMENTS

| | | | |
|---|---|---|---|
| 3,916,096 | 10/1975 | Everett et al. | 178/6.6 R |
| 4,040,094 | 8/1977 | Everett et al. | 358/283 |
| 4,149,194 | 4/1979 | Holladay | 358/298 |
| 4,185,304 | 1/1980 | Holladay | 358/298 |
| 4,245,258 | 1/1981 | Holladay | 358/280 |
| 4,308,326 | 12/1981 | Wirth | 430/6 |
| 4,339,774 | 7/1982 | Temple | 358/283 |
| 4,468,706 | 8/1984 | Cahill | 358/300 |
| 4,517,606 | 5/1985 | Yokomizo et al. | 382/50 |
| 4,533,941 | 8/1985 | Keane et al. | 358/75 |
| 4,554,593 | 11/1985 | Fox et al. | 358/282 |
| 4,651,287 | 3/1987 | Tsao | 364/519 |
| 4,654,721 | 3/1987 | Goertzel et al. | 358/75 |
| 4,673,971 | 6/1987 | Ikuta et al. | 358/75 |
| 4,675,743 | 6/1987 | Riseman et al. | 358/263 |
| 4,677,571 | 6/1987 | Riseman et al. | 364/519 |
| 4,698,691 | 10/1987 | Suzuki et al. | 358/283 |
| 4,706,077 | 11/1987 | Roberts et al. | 340/728 |
| 4,722,008 | 1/1988 | Ibaraki et al. | 358/283 |
| 4,730,185 | 3/1988 | Springer et al. | 358/78 |
| 4,805,033 | 2/1989 | Nishikawa | 358/298 |
| 4,821,334 | 4/1989 | Ogino et al. | 382/50 |
| 4,920,501 | 4/1990 | Sullivan et al. | 358/458 |

OTHER PUBLICATIONS

Ulichey, *Diital Halftoning*, Chapt. 5.
Perry & Mendelsohn *Picture Generation With a Standard Line Printer*, May 1964; vol. 7; No. 5; pp. 311-313.

*Primary Examiner*—Edward L. Coles, Sr.
*Assistant Examiner*—Jerome Grant, II
*Attorney, Agent, or Firm*—Edward Dugas

[57] ABSTRACT

A digital halftone image is produced by providing a binary bit image pattern having a minimum visual noise for each density level in the image, and the binary bit patterns being correlated in a manner that reduces visual noise resulting from transitions between patterns. The patterns are addressed by pixel density and x,y location to produce a halftone image. The patterns are generated by employing a stochastic minimization technique with a constraint to insure correlation between patterns.

4 Claims, 6 Drawing Sheets

DIGITAL HALFTONING WITH CORRELATED MINIMUM VISUAL MODULATION PATTERNS

This is a continuation-in-part of U.S. Ser. No. 476,090 filed Feb. 9, 1990 in the names of J. R. Sullivan and Lawrence R. Ray; now abandoned.

TECHNICAL FIELD

The present invention relates to the field of digital image processing and more particularly to a method for digital halftoning continuous-tone images using a correlated data base of minimum visual modulation bit-map patterns.

BACKGROUND ART

Digital halftoning for the purpose of generating continuous-tone images has been practical since the mid-1960's (see "Picture Generation with a Standard Line Printer," by Perry and Mendelsohn, Comm. of the ACM, Vol. 7, No. 5, pp 311-313). The two major techniques in current use are dithering and error diffusion. See *Digital Halftoning* by Ulichney, MIT Press, Cambridge, Mass., pp 77-79, 127, 239-240. The prime dithering techniques are random dither, clustered-dot dither, and dispersed-dot dither. Random dither was developed first, but it is rarely used because it produces the poorest quality image.

The other two dither techniques are used with clustered-dot being by far the most prevalent. They are both based upon a threshold screen pattern that is generally a fixed size., e.g., 8×8 image pixels, which is compared with the input digital image values. If the input digital value is greater than the screen pattern number, the output is set "on", i.e., 255 for an 8-bit input image, and if it is less, the output is set to "off" or 0. The difference between the two techniques is the lower threshold values, which are centered in the clustered-dot screen pattern, but scattered in the dispersed-dot screen pattern. The clustered-dot technique has a central dot that increases in size as the signal level increases and the dispersed-dot technique has small scattered dots that increase in number as the signal level increases. In both techniques the number of levels that can be represented is equal to the size of the pixels of the screen pattern, e.g., an 8×8 screen can produce 64 unique levels.

Figure 1:
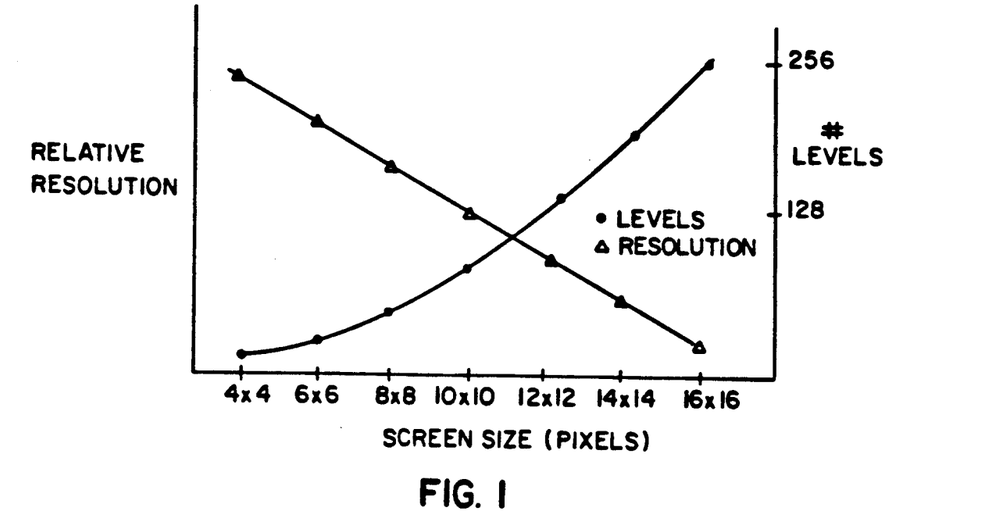
FIG. 1 is a graph illustrating the resolution versus number of levels tradeoff of conventional fixed screen dither.

Larger patterns allow more levels, but also a reduction in the effective resolution because the transition between levels is at a coarser pitch. At the medium pixel rate of copiers and laser printers, e.g., 300-500 dots/inch, the pattern artifacts are visible for screen patterns larger than 4×4, and since 16 levels are inadequate precision for typical continuous-tone imagery a suboptimal resolution/level tradeoff (see FIG. 1).

Figure 2:
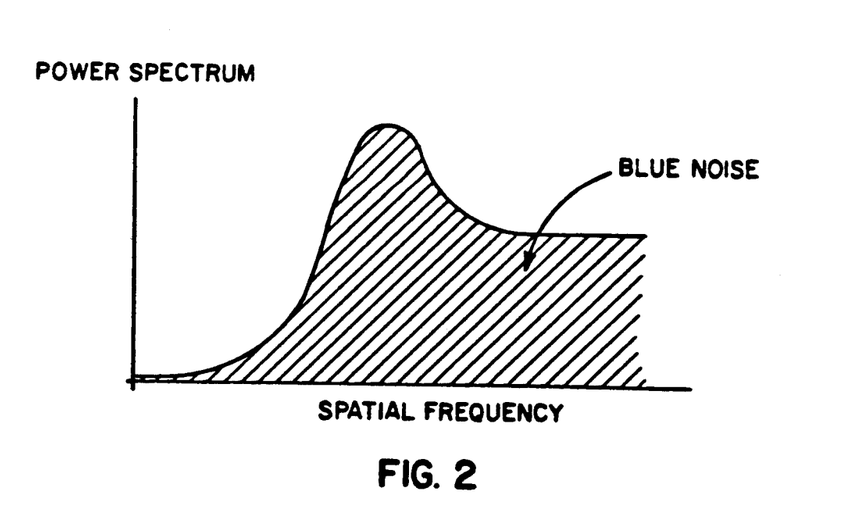
FIG. 2 is a graph showing the "blue noise" spectrum of the high frequency noise that results from conventional fixed screen dither.

Error diffusion is fundamentally different from dither in that there is no fixed screen pattern, instead a recursive algorithm is used that attempts causally to correct errors made by representing the continuous input signal by binary values. The two major components are a matrix of fractions that weight past errors and a threshold operator based on the sum of those weighted errors and the current pixel that determines whether to output an "on" or an "off." The best error diffusion techniques are two-dimensional, meaning that the error is fed back from previous lines as well as previous pixels. The error feedback mechanism is usually linear in that the sum error is a linear combination of past errors, but the thresholding is nonlinear making the compound process nonlinear. Approximating thresholding as a signal-dependent gain, it can be shown that for positive error weights the output binary signal will be high-pass in uniform regions thus introducing "blue noise" into the image (see Ulichney, cited above). This "blue noise" spectrum is shown in FIG. 2. As discussed by Ulichney, this "blue noise" is a very favorable feature because the perception of this noise will be reduced by the low-pass filtering of the visual system causing a higher perceived signal-to-noise ratio. Unfortunately, the error weights are indirectly related to this preferred noise characteristic and therefore provide suboptimal control, and for certain signal levels the causal feedback can become visually unstable generating correlated patterns or "worms" that are highly objectionable. The most common solution is modulating the weights randomly which reduces the "worms" but also increases the noise.

It is the object of the present invention to provide a new digital halftoning technique that improves the image quality over the aforementioned techniques for all classes of images of interest to a human observer. The approach is a combination of the minimal visual modulation patterns and the correlated clustered-dot algorithms.

SUMMARY OF THE INVENTION

The objects of the present invention are achieved by designing and storing NxN pixel (e.g., 32×32), bit-map patterns for each density level in an image, that are correlated and have minimum visual noise within the constraints imposed by correlation, and modularly addressing those patterns with each pixel value and Pixel location in the image. In a preferred mode of practicing the invention, the bit-map patterns are produced using a combinatorial minimization algorithm called stochastic annealing or simulated annealing and a human visual system MTF weighting function to weight the discrete Fourier Transform of each pattern to determine the perceived noise. Each pattern corresponding to an input signal is produced in a fashion such that it is correlated with previously produced patterns. The process for the correlation is based upon a binary tree. The order of pattern selection is made in such a way to maximize the degrees of freedom, yet to assure the patterns remain correlated. This approach will be described in detail below.

If the patterns are denoted with the notation p/q where p is the serial number of the pattern and q is the number of patterns in the series, then for an 8-bit signal having 256 possible signal levels pattern 0/256 consists of all pixels "off" and pattern 255/256 consists of all pixels "on." The order of selection of patterns is given by a binary search. The basic idea in this search is for patterns to be correlated, but not construct the sequence of correlations in a serial manner. The precise mathematical description of the correlation process is formally expressed. Let pattern p/256 be determined then previously determined patterns $p_{inf}$ and $p_{sup}$ which constrain the pattern selection process are selected according to the following algorithm:

Represent p in binary as $p = b_8 b_7 b_6 b_5 b_4 b_3 b_2 b_1$ where $b_i$ is either a 0 or 1, and consider the representation as a character string. Let i be the smallest index such that $b_i = 0$ for ji, and $i = 0$ if $b_1 = 1$. Let $z_i = 2^i$. The upper pattern is then $p_{sup} = p + z_i$ and the lower pattern is then $p_{inf} = p - z_i$. For instance, if $p=138=10001010$, then $i=1, z_1=2$ and $p_{inf}=136$ and $p_{sup}=140$.

Let $D_{inf}$ and $D_{sup}$ be the configuration of "on" dots in patterns $p_{inf}$ and $p_{sup}$ respectively. The optimization process described below is constrained to select a set of dots within minimum visual modulation such that all the "on" dots of $D_{inf}$ plus half of the Positions of the set $D_{sup}-D_{inf}$ are "on." This method is suboptimal because the requirement that D contains all "on" dots of $D_{inf}$ will result in patterns which are unlikely to be optimal in a global sense. However, the advantage is that patterns are spatially correlated, so small changes in the input signal level do not introduce phase noise as patterns are transitioned. Moreover, the use of a binary tree to produce the patterns assures that the deviation from an optimal selection is minimized in comparison to a serial pattern generator, i.e., pattern (p+1)/256 is simply determined by adding 4 "on" dots to pattern p/256. The approach to correlation of dot patterns is similar to the approach taken by B. E. Bayer for dispersed-dot dither (see "An Optimal Method for Two-Level Rendition of Continuous-Tone Pictures," by B. E. Bayer, Proc. IEEE Int. Conf. Comm. Conference Record, pp (26-11)-(26-15)), in that once a dot is "on" it remains "on" throughout the sequence of patterns.

In order to begin the process, pattern 0/256 has all dots set to "off" and pattern 255/256 has all dots set to "on." For simplicity, pattern 255.256 is identified with pattern 256/256. The next pattern to be determined is pattern 128/256, where half the dots are in the "on" state.

To use the patterns for halftoning, it is assumed that a continuous-tone image is digitized into a 8-bit signal. For a digital image produced by scanning a continuous-tone image the process includes the following steps. For a given pixel value of the digital image signal, select the pattern which matches the input signal. The (x,y)-position of the digital input signal is modularly transformed to a position within the halftone pattern screen by (a,b) =(x mod32,y mod32). The state of the pattern at the position (a,b) is output to the printer.

MODES OF CARRYING OUT THE INVENTION

The method for generating a halftone image according to the present invention involves designing correlated minimum visual modulation patterns for each input pixel signal level, and modularly addressing the pattern to select bits to be used in the halftone image. The bit-map pattern design will be described first, followed by a description of the addressing and pattern selection process.

The goal of the invention is to minimize the visually perceived modulation for a pattern of zeroes and ones that on average represent a particular signal level. Moreover, the patterns must be sufficiently correlated in order to reduce any artifacts that occur because of shifts in the input signal level. The first aspect of the pattern generation criteria requires the definition of visual modulation or cost for a given pattern and a method for cost minimization. The second aspect of the pattern generation is to correlate the patterns such that small changes in input levels do not result in undesirable output signal modulation.

Figure 3:
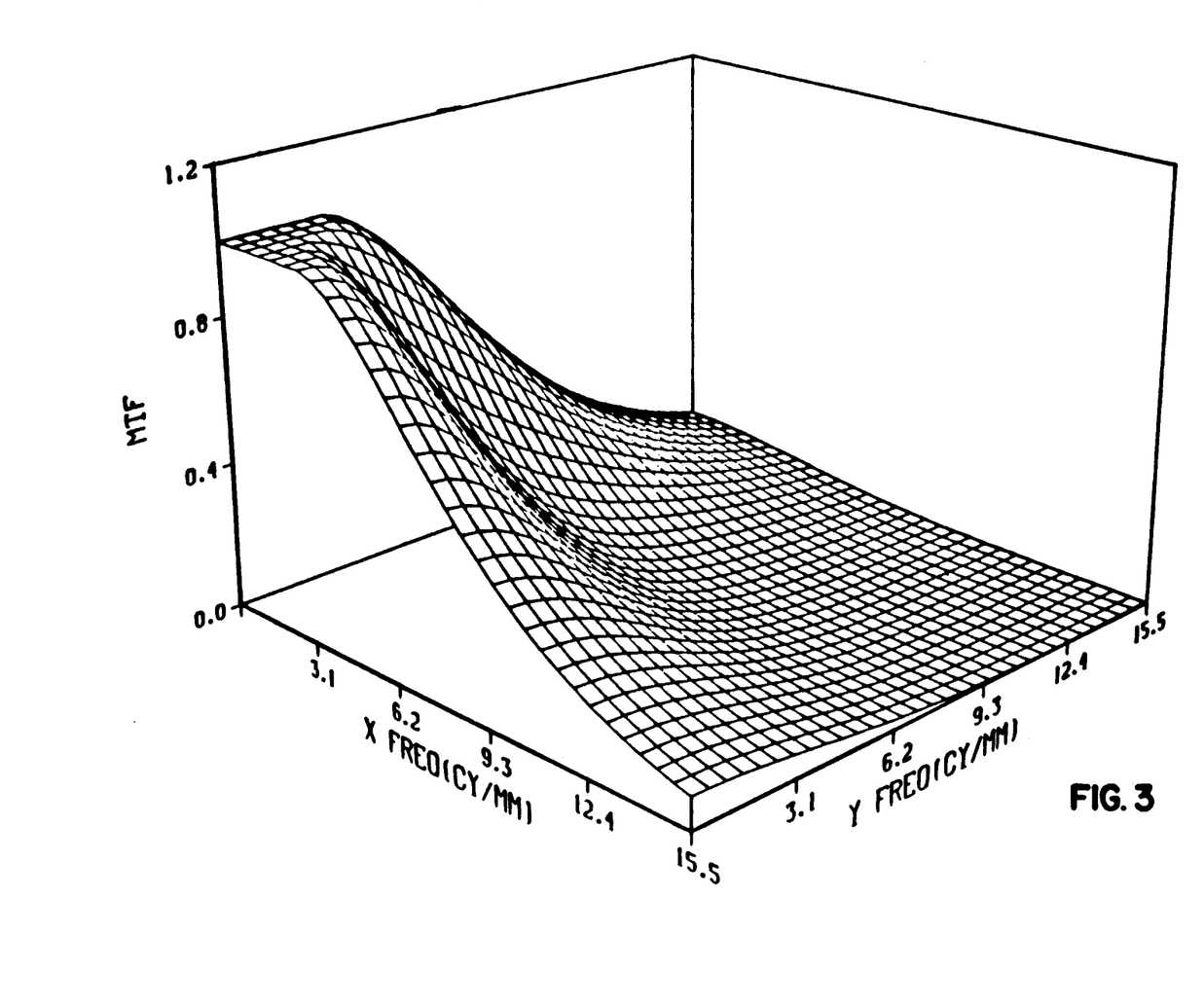
FIG. 3 is a graph showing the human visual system transfer function used to weight the discrete Fourier Transform of the bit-map pattern in the stochastic annealing process.

For normal viewing distance, i.e., 10 inches, the effective two-dimensional modulation transfer function, MTF, of the human visual system is shown in FIG. 3. It shows the low-pass filter characteristic of the vision system and the loss of sensitivity at 45 degrees corresponding to the dip in the MTF surface at that angle. This function is given by:

$$V_{ij} = \begin{cases} a(b + c\tilde{f}_{vij})\exp(-c\tilde{f}_{vij})^d & \text{if } f_{vij} > f_{max} \\ 1.0 & \text{elsewhere} \end{cases} \quad (1)$$

where the constants a,b,c, and d are calculated by regression fits of horizontal and vertical modulation data to be 2.2, 0.192, 0.114, and 1.1 respectively. $\tilde{f}_{vij}$ is the radial spatial frequency in cycles per degree of visual subtense, scaled for a given viewing distance, and $f_{max}$ is the frequency in cycles per degree at which the frequency $V_{ij}$ peaks $\tilde{f}_{vij}$ is calculated as:

$$\tilde{f}_{vij} = \frac{f_{vij}}{s_{ij}(\theta)}, \quad (2)$$

where $$f_{vij}(\text{cycles/degree}) = \frac{\pi}{180 \arcsin\left(\frac{1}{\sqrt{1+dis^2}}\right)} (f_i^2 + f_j^2)^{\frac{1}{2}}; i,j = 1, 2, \ldots 32,$$

wherein dis is the viewing distance in mm,
$f_i = (i-1)/\Delta N$ = horizontal on a document in cycles/mm
$f_j = (j-1)/\Delta N$ = vertical on a document in cycles/mm
$N = 32$,
$\Delta$ = dot spacing on a document, e.g., 0.0625 mm, $$S_{ij} = 0.5(1-w)\cos(4\theta) + 0.5(1+w); \quad (3)$$

where w is the bandwidth parameter
$\theta = \arctan(f_j/f_i)$.

To evaluate the cost for a particular N×N bit pattern, the modulus of the discrete Fourier Transform (DFT) of the pattern is calculated and multiplied by the visual MTF and summed. That is $$\text{cost} = \sum_{i=1}^{N}\sum_{j=1}^{N} V_{ij}\sqrt{P_{ij}P_{ij}^*}. \quad (4)$$

where i,j and x,y spatial frequency indices with i,j=N representing the output binary pixel rate, $V_{ij}$ is the visual MTF scaled to the output pixel rate, $P_{ij}$ is the pattern DFT, and * represents complex conjugation. The Fourier domain was chosen for the minimization because the DFT assumes the input is periodically replicated in a tile fashion over all space which is consistent with the modular addressing of the pattern to be described below. A 32×32 region is preferred to allow sufficient degrees of freedom in the Fourier domain to shape the noise into a "blue-noise" spectrum as in FIG. 2 without the excessive complexity of larger areas, and it easily accommodates the 256 levels on an 8-bit input signal wit each level corresponding to four "on" dots. However, other size patterns, such as 8×8 or 16×16 can be employed with the present invention.

If pattern p/256 is to be determined, then the number of combinations that may occur is:

$$\binom{4(p_{sup} - p_{inf})}{2(p_{sup} - p_{inf})} = \frac{(4(p_{sup} - p_{inf}))!}{(2(p_{sup} - p_{inf}))!(2(p_{sup} - p_{inf}))!} \quad (5)$$

which is a very large number in all but a few cases. To overcome this combinatorial problem a stochastic minimization method called stochastic annealing or simulated annealing was used (see for example, "Stochastic Relaxation, Gibbs Distributions, and Bayesian Restoration of Images," by S. German and D. German, IEEE Trans. on PAMI, Vol PAMI-6, No. 6, Nov. 1984, pp.721-741). The key feature of this iterative technique as compared to more traditional minimization techniques such as steepest descent is that local minima can be escaped by accepting cost increases at each iteration with a decreasing but greater than zero probability. In order to insure correlation between patterns the following constraint is added to the stochastic annealing process: Let $D_{sup}$ = {"on" dots in the upper bounding pattern}
$D_{inf}$ = {"on" dots in the lower bounding pattern)
$D = D_{sup} \times D_{inf}$ Patterns are correlated by selectively combining the lower pattern and the upper pattern to create an intermediate pattern, i.e., $D_{inf} + \frac{1}{2}D_{sup}$. If a pattern p/256 is to be determined then the algorithm previously described specifies the boundary patterns.

The minimization process includes the following steps:

1) Initialize a given density level pattern by adding to the set $D_{inf}$ half of the elements in the set D. The selection of the elements of D is random;
2) Calculate cost using equation (4);
3) Randomly switch a pair of "on/off" in the set D dots and calculate a new cost using equation (4);
4) Calculate a test statistic q for determining whether the new pattern is from a lower cost random process given by:

$$q = \exp\left(\frac{-\Delta\text{cost}}{T}\right)$$

where Δcost=[new cost]−[previous cost], and T is a normalization parameter initially set such that a large percentage, e.g., 80% of new patterns will be judged to be from a lower cost random process even if the Δcost is greater than zero;

5) If q>1, i.e., Δcost 0, accept the new pattern; if q1, accept the pattern if ξq, where ξ is a uniform psuedo-random number between 0 and 1, and reject the new pattern and revert to the previous pattern if ξ>q;
6) After many loops of steps 3-5, i.e., 1500, decrease T to κT where κ1, i.e., 0.95, and go to step 3 so positive Δcost values are accepted with geometrically decreasing likelihood as the search proceeds;
7) Stop when the cost at successive decreases in T are no longer changing or when a fixed number of decreases have occurred, e.g., 300.

A computer program written in FORTRAN for implementing the minimization process is included in Appendix A. This program was executed on a CRAY X-MP/48 supercomputer to produce a set of 256 correlated minimum visual noise binary bit patterns, corresponding to 256 density levels.

Figure 4A:
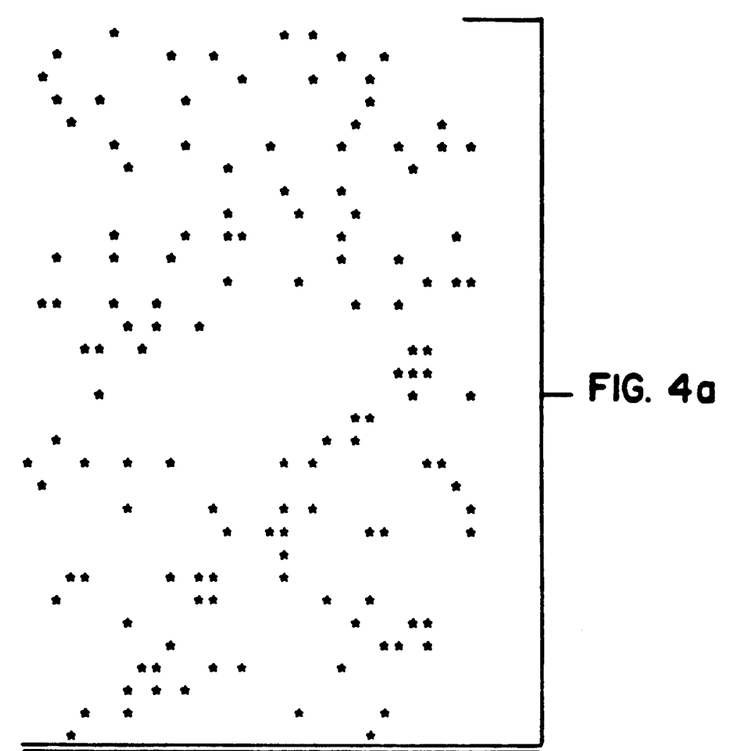
FIG. 4a is an example of an initial random bit-map pattern for a mean level of ½th or 128 'on' dots.
Figure 4B:
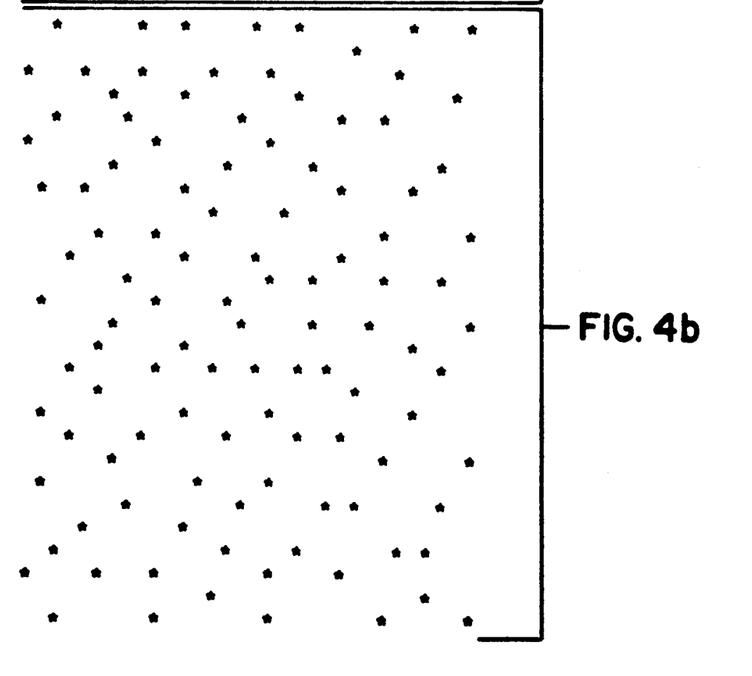
FIG. 4b is an example of a final minimum cost bit-map pattern for a mean level of ½th or 128 'on' dots.
Figure 5:
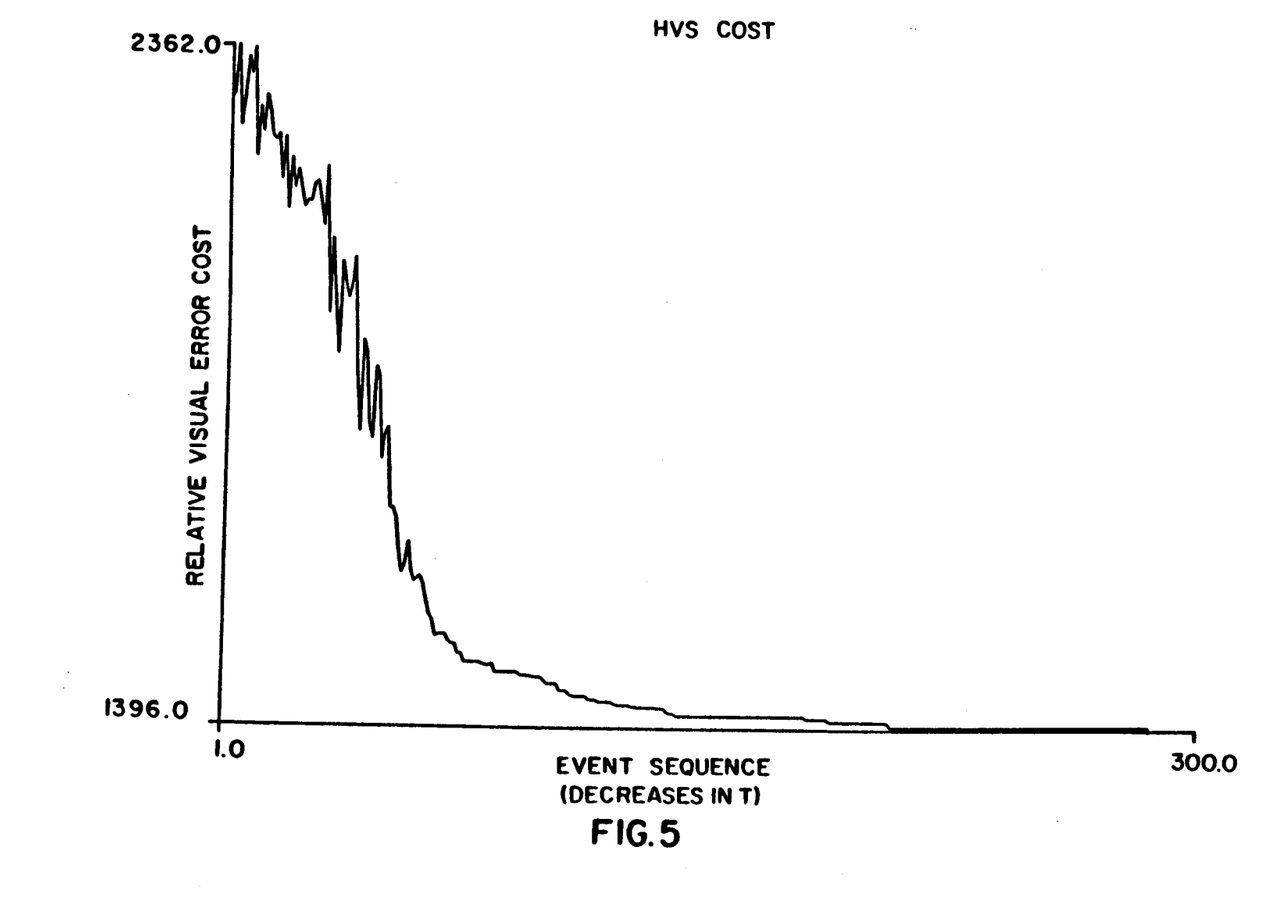
FIG. 5 is a graph showing the relative visual error cost at each T value for the annealing process that generates the pattern in FIG. 4b.

FIGS. 4a and 4b show the "on" pixel patterns for the initial quasi-random pattern and the final minimum cost pattern for a mean level of ¼th or 256 dot "on" dots that resulted in a single run of this process. As the figures show the final pattern appears random, but in fact is more spatially regularized without large gaps or clumps which lead to undesirable low frequency modulation. FIG. 5 shows the progression of cost estimates at each decrease in T with each temporary dip in the curve being a local minimum from which the minimization process escaped. In addition, empirical results indicate that multiple runs produce slightly different final patterns due to the inherent randomness of the search process and that better results can be achieved by selecting the pattern with the lowest final cost from a number of independent searches with the same initial conditions. The number of searches is proportional to the number of levels which have already been decided. In particular, a larger number of runs are made for pattern 128 as compared to pattern 28.

Figure 6:
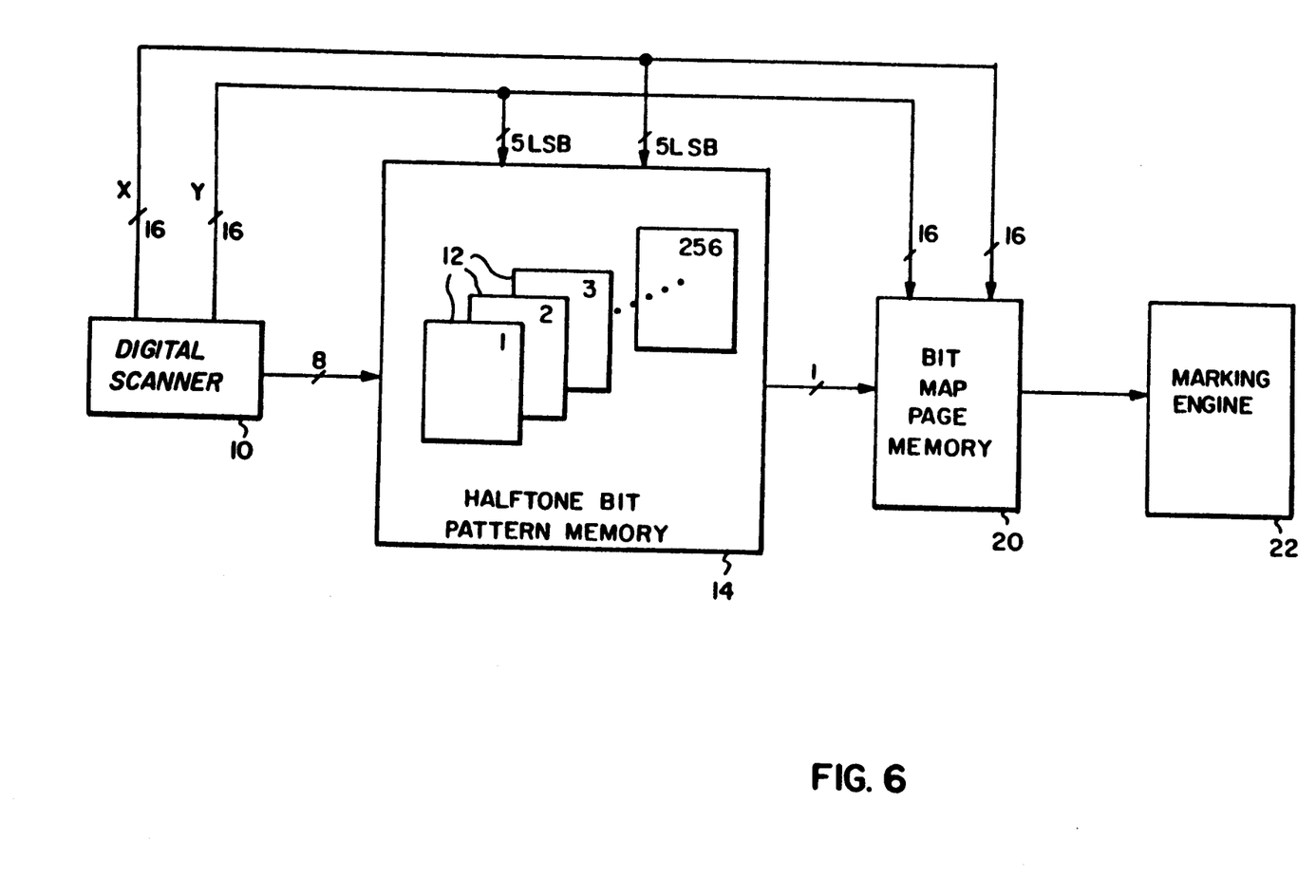
FIG. 6 is a block diagram showing the halftone image processing technique according to the present invention for constant tone graphics.
Figure 7:
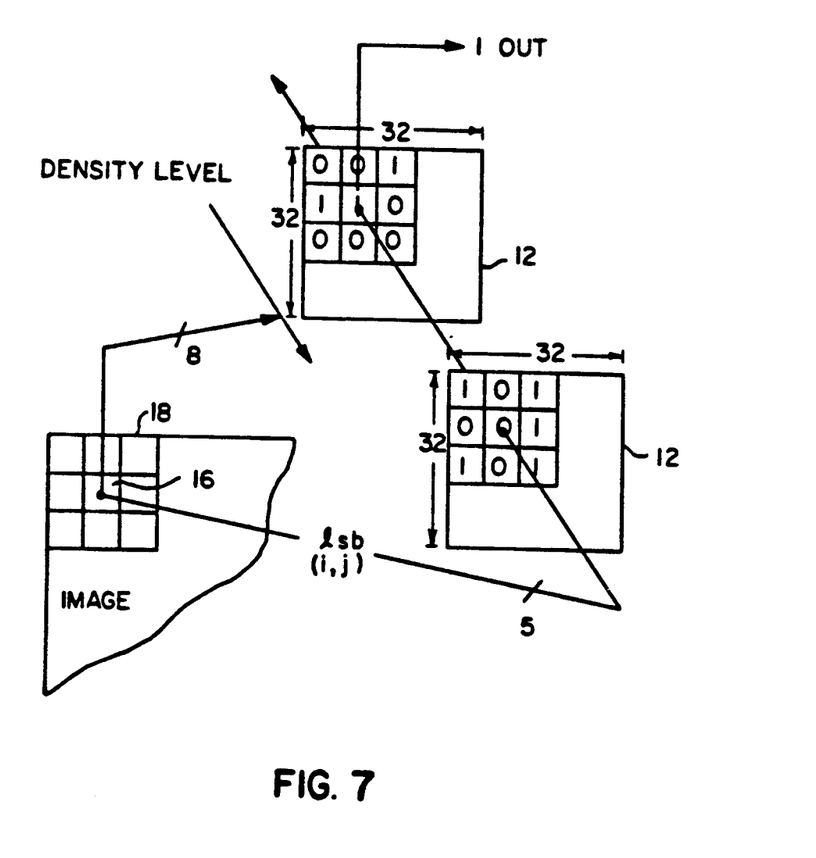
FIG. 7 is a diagram showing the addressing of the data base as the input image is processed.

Referring to FIG. 6, the method of generating a halftone image according to the present invention is illustrated schematically. A digital monochrome image is generated by an input device such as a digital scanner 10. The digital image is supplied as an 8-bit input signal with each pixel represented by one of 256 input levels. As illustrated schematically in FIG. 7, the (x,y) location of the pixel 16 on a page 18 is identified by two 16-bit words. Two hundred-fifty-six 32×32 bit halftone patterns 12 generated on the supercomputer as previously described are stored in a bit pattern memory 14 (see FIG. 6). The 8-bit density level for a pixel from the input signal is employed to select the halftone dot pattern 12 from the pattern data-base. The five least significant bits of the x and y location address is employed to address the location in the pattern table 12, and the halftone bit is stored in the page memory 20 (see FIG. 6) at the indicated pixel location.

When the page memory 20 is full or the image is completed, the contents are supplied to a binary marking engine 22, such as a laser or ink jet printer. Alternatively, if the input is synchronized with the marking engine, the output of the bit pattern memory may be supplied directly to the marking engine without the need for a bit map page memory 20.

The halftone dot pattern generation steps of the halftone image generation process described with reference to FIG. 6 is implemented simply by a programmable read-only-memory 14 in which the halftone bit patterns are stored.

Industrial Applicability and Advantages

The halftoning technique of the present invention is useful in systems that generate binary outputs from continuous-tone input images or computer generated graphics. The invention has the advantage that it does not have the periodic patterns of dithering or correlated directional noise of error diffusion. The method has implementation advantages over error diffusion because it does not require any arithmetic operations other than modulo arithmetic which can be easily performed by a simple bit masking operation. The reason for this is because the data base is accessed by a simple addressing scheme, whereas error diffusion involves weighting the differences between input and output values which are not binary. Additionally, the halftoning scheme of the present invention requires less storage than error diffusion.

APPENDIX A

```
      PROGRAM patterns
c
c This program searches for a minimum pattern of k 'on' values in
c a 32x32 block by the technique of stochastic annealing using the
c human visual weighted modulation as an objective function.
c
      real pat(32,32),img(32,32),hvsmtf(32,32),vect(1024),newcst
      real best(32,32),cost(1000),event(1000)
      complex coef(32,32)
      character*12 lowpattern, highpattern,midpattern
      common /store/ xreal(1024), ximag(1024), work(1024)
      common /design/ highpat(1024), lowpat(1024), point(1024), numon,
     1                nunoff, ndots
      integer highpat, lowpat
      integer point,trys,count
      dimension nd(2)
      data nd/2*32/
      data img/1024*0.0/,vect/1024*0.0/
      equivalence (vect(1),pat(1,1))
      call g05ccf(0)
      open(unit=25,file='annealin.data',status='old')
      read(25,1013) lowpattern
      read(25,1013) highpattern
      read(25,1013) midpattern
 1013 format(a12)
c
c     get old patterns and prepare for annealing on new pattern
c
      open(unit=30,file=highpattern)
      read(30,1014) (highpat(i),i=1,1024)
      close(unit=30)
      open(unit=30,file=lowpattern)
      read(30,1014) (lowpat(i),i=1,1024)
      close(unit=30)
 1014 format(31(32i1/),32i1)
      nlowdots = 0
      nhidots= 0
      do 1500 i = 1,1024
      nlowdots = nlowdots + lowpat(i)
      nhidots = nhidots + highpat(i)
 1500 continue
      read(25,*) trys,ntemp
      numon = (nhidots - nlowdots) / 2
      ndots = nhidots - nlowdots
      numoff=ndots-numon
      read(25,*) spac,vdis,bw,iclip
      call hvs(32,vdis,spac,bw,iclip,hvsmtf)
      read(25,*) rate
      close(unit=25)
      call tset(spac,vdis,bw,iclip,1000.0,t0)
```

```
c
c generate random start pattern and find initial cost
c
      t=t0
      count=0
      moves=1
      icommon = ndots+1
      jcommon = 1
      do 1 i = 1,1024
      vect(i) = 0.0
    1 continue
      do 5 i = 1,1024
      if (highpat(i) .eq. lowpat(i)) then
          point(icommon) = i
          vect(i) = highpat(i)
          icommon = icommon + 1
      else
          point(jcommon) = i
          jcommon = jcommon + 1
      endif
    5 continue
      call g05ehf(point,ndots,ifail)
      do 10 i=1,numon
      vect(point(i)) = 1.0
   10 continue
      do 20 i=1,1024
      best(i,1)=vect(i)
      coef(i,1) = cmplx(vect(i),0.0)
   20 continue
      call hc2dft(coef,32,32,32,1,work,32,ifail)
      oldcst=0.0
      do 40 i=1,1024
      oldcst=oldcst+hvsmtf(i,1)*cabs(coef(i,1))
   40 continue
c
c randomly select element to turn off and a second element to turn on
c and update pointer array to on and off elements
c
   55 continue
      index1=int(g05caf(xxx)*numon+1)
      index2=int(g05caf(xxx)*numoff)+1+numon
      vect(point(index1))=0.0
      vect(point(index2))=1.0
      itemp=point(index1)
      point(index1)=point(index2)
      point(index2)=itemp
c
c calculate new cost
c
      count=count+1
      do 70 i = 1,1024
      coef(i,1) = cmplx(pat(i,1),0.0)
   70 continue
      call hc2dft(coef,32,32,32,1,work,32,ifail)
      newcst=0.0
      do 80 i=1,1024
      newcst=newcst+hvsmtf(i,1)*cabs(coef(i,1))
   80 continue
c
c estimate gibbs distribution and compare with u    n random number
c If new move accepted update cost and keep modifi.  .ector.
c If not do not update cost and change vector back to unmodified version.
c
      delc=newcst-oldcst
      r=-t*alog(g05caf(xxx))
      if(delc.le.r) then
        oldcst=newcst
```

```
      else
        vect(point(index1))=0.0
        vect(point(index2))=1.0
        itemp=point(index1)
        point(index1)=point(index2)
        point(index2)=itemp
      endif
c
c determine whether to change temperature
c
      if(count.lt.trys) go to 55
c
c change temperature and restart from last iteration of previous
c temperature if the maximum number of temperatures have not been reached
c
      t=t*rate
      count=0
      cost(moves)=oldcst
      moves=moves+1
      if(moves.le.ntemp) go to 55
      do 100 i=1,1024
      best(i,1)=vect(i)
  100 continue
      open(unit=45,file='final')
      write(45,1010) bigfour,bigcost,bigtemp
 1010 format(3f12.6)
      close(unit=45)
      do 110 i = 1,1024
      highpat(i) = best(i,1) + 0.5
  110 continue
      open(unit=15,status='new',file=midpattern)
      write(15,1014) (highpat(i), i=1,1024)
 1003 format(32f2.0)
      write(15,1004) (cost(i),i=1,moves)
 1004 format(5e12.4)
      write(15,1005) t
 1005 format('next temperature',e14.4)
      cmax=0.0
      cmin=1.e20
      evemax=float(moves)
      do 120 i=1,moves
      cmax=amax1(cmax,cost(i))
      cmin=amin1(cmin,cost(i))
      event(i)=float(i)
  120 continue
      close(unit=15)
      stop
      end
c*************************************************** HVS
      subroutine hvs(n,vdis,spac,bw,iclip,hvsmtf)
      real hvsmtf(n,n),vfx(256),vfy(256)
      data pi/3.141593/,a/2.2/,b/0.192/,c/0.114/,d/1.1/
      scale=pi/(asin(1./sqrt(1.+vdis**2))*180.)
      m=n/2+1
      delf=1./(2.*(m-1)*spac)
      do 10 i=1,m
      vfx(i)=(i-1)*delf*scale
      vfy(i)=(i-1)*delf*scale
   10 continue
      do 30 i=m,1,-1
      do 20 j=m,1,-1
      freq=sqrt(vfx(i)**2+vfy(j)**2)
      angle=pi/2
      if(vfx(i).ne.0.0) angle=atan(vfy(j)/vfx(i))
      angfac=cos(4*angle)*(1.-bw)/2.+(1.+bw)/2.
      hvsmtf(i,j)=a*(b+c*freq/angfac)*exp(-(c*freq/angfac)**d)
```

```
           if(iclip.eq.0.and.j.lt.n) then
             if(hvsmtf(i,j).lt.hvsmtf(i,j+1)) then
               hvsmtf(i,j)=hvslast
             else
               hvslast=hvsmtf(i,j)
             endif
           endif
   20    continue
   30    continue
         call fold(n,hvsmtf)
         return
         end
c
c**************************************************************** FOLD
c
         subroutine fold(n,array)
         real array(n,n)
c
c fold about n/2+1 along y
c
         do 20 j=1,n/2+1
         do 10 i=2,n/2
         ifold=n+2-i
         array(ifold,j)=array(i,j)
   10    continue
   20    continue
c
c fold about n/2+1 along x
c
         do 40 i=1,n
         do 30 j=2,n/2
         jfold=n+2-j
         array(i,jfold)=array(i,j)
   30    continue
   40    continue
         return
         end
c
c**************************************************************** TSET
c
         subroutine tset(spac,vdis,bw,iclip,xter,temp0)
c
c This program examines individual modifications of initial patterns
c for determining the initial temperature to start a stochastic
c annealing process.  Initial temperature is set such that 80% of the
c time the first 'uphill' move will be accepted.
c
         common /design/ highpat(1024), lowpat(1024), point(1024), numon,
        1                numoff, ndots
         integer highpat, lowpat, point
         real pat(32,32),img(32,32),hvsmtf(32,32),vect(1024),newcst
         real best(32,32),cost(5000),xbin(25),cum(25),histo(25)
         dimension work(1024)
         complex coef(32,32)
         data img/1024*0.0/,vect/1024*0.0/,histo/25*0.0/, nsamples/100/
         data fudge / 4.48142 /
         equivalence (vect(1),pat(1,1))
         call hvs(32,vdis,spac,bw,iclip,hvsmtf)
c
c generate random start pattern and find initial cost
c
         count=0.
    1    continue
         icommon = ndots+1
         jcommon = 1
         many = many + nsamples
         do 2 i = 1,1024
```

```
      vect(i) = 0.0
2  continue
   do 4 i = 1,1024
      if (highpat(i) .eq. lowpat(i)) then
          point(icommon) = i
          vect(i) = highpat(i)
          icommon = icommon + 1
      else
          point(jcommon) = i
          jcommon = jcommon + 1
      endif
4  continue
   call g05ehf(point,ndots,ifail)
   do 10 i=1,numon
   vect(point(i)) = 1.0
10 continue
   do 20 i=1,1024
   best(i,1)=vect(i)
   coef(i,1)=cmplx(best(i,1),0.0)
20 continue
   call hc2dft(coef,32,32,32,1,work,32,ifail)
   cost0=0.0
   do 40 i=1,1024
   cost0=cost0+hvsmtf(i,1)*cabs(coef(i,1))
40 continue
c
c randomly select element to turn off and a second element to turn on
c  and update pointer array to on and off elements
c
55 index1=int(g05caf(xxx)*numon)+1
   index2=int(g05caf(xxx)*numoff)+1
   vect(point(index1))=0.0
   vect(point(numon+index2))=1.0
   itemp=point(index1)
   point(index1)=point(numon+index2)
   point(numon+index2)=itemp
c
c calculate new cost and reset original pattern
c
   do 60 i=1,1024
   coef(i,1)=cmplx(pat(i,1),0.0)
60 continue
   call hc2dft(coef,32,32,32,1,work,32,ifail)
   newcst=0.0
   do 80 i=1,1024
   newcst=newcst+hvsmtf(i,1)*cabs(coef(i,1))
80 continue
   count=count+1.
   cost(int(count))=newcst-cost0
   vect(point(index1))=0.0
   vect(point(numon+index2))=1.0
   itemp=point(index1)
   point(index1)=point(numon+index2)
   point(numon+index2)=itemp
   if (count.ge.many) go to 1
   if(count.lt.xter) go to 55
   nest=int(count)
   cmax=-1.e20
   cmin=1.e20
   do 130 i=1,nest
   cmax=amax1(cmax,cost(i))
   cmin=amin1(cmin,cost(i))
130 continue
   cbin=(cmax-cmin)/25.
   do 140 i=1,nest
   ibin=int((cost(i)-cmin)/cbin)+1
```

```
        if(ibin.gt.25) ibin=25
        histo(ibin)=histo(ibin)+1
140 continue
        cum(1)=histo(1)
        do 150 i=1,25
        xbin(i)=cmin+(float(i)-.5)*cbin
        if(i.ge.2) cum(i)=histo(i)+cum(i-1)
150 continue
        hismax=0.0
        do 160 i=1,25
        histo(i)=histo(i)/cum(25)
        hismax=amax1(hismax,histo(i))
        cum(i)=cum(i)/cum(25)
160 continue
        do 170 i = 1,25
        if (cum(i) .gt. 0.80) then
            temp0 = xbin(i) * fudge
            go to 180
        endif
170 continue
180 continue
        return
        end
```

We claim:

1. A method of generating a halftone image from a digital image with an electronic digital computer, comprising the steps of:

A) providing a set of correlated minimal visual noise binary patterns of all desired density levels, determined by employing a stochastic annealing process, a human visual system modulation transfer function (MTF) weighting function, and a constraint to insure that the patterns are correlated, to generate a halftone bit pattern for each density level of a multilevel digital input signal, the patterns being correlated in a manner that reduces visual noise resulting from transitions between patterns, with said annealing process comprises the steps of:

a) determining sets $D_{inf}$, $D_{sup}$ and D from the boundary patterns $P_{inf}$, $P_{sup}$, where $D_{inf}$ = ("on" dots in the pattern $P_{inf}$)

$D_{sup}$ = ("on" dots in the pattern $P_{sup}$)

D = Dsup − Dinf in a set-theoretic sense;

b) initializing a pattern $P_{mid}$ with the "on" dots in the set $P_{inf}$ and a random selection of half the dots in the set D so that the number of "on" dots is proportional to the density level of the pattern;

c) defining subsets $D_{on}$ and $D_{off}$ of set D, where $D_{on}$ is the set of dots in the D that are set "on" in the pattern $P_{mid}$, and $D_{off}$ is the set of dots in D that are set "off" in the pattern $P_{mid}$;

d) calculating a cost function according to the equation $$\text{cost} = \sum_{i=1}^{N} \sum_{j=1}^{N} V_{ij} \sqrt{P_{ij} P_{ij}^*}$$

where i,j are the spatial frequency indices, $V_{ij}$ is a visual MTF scaled to those indices, $P_{ij}$ is the discrete Fourier Transform (DFT) of the pattern $P_{mid}$, and * represents complex conjugation;

e) randomly switching at least a pair of dots from subsets $D_{on}$ and $D_{off}$ to form a new pattern and calculating the cost function of the new pattern according to step d;

f) calculating a test statistic q to determine if the cost function at step e) is statistically a lower cost than the cost of step d) according to the process $$q = \exp\left(\frac{-\Delta \text{cost}}{T}\right)$$

where $\Delta\text{cost}$ = cost of step e) − cost of step d), and T is a normalization parameter initially set such that about 80% of new patterns will be determined to be from a lower cost random process even when $\Delta\text{cost}$ is greater than zero;

g) replacing the pattern with $P_{mid}$ generated in step c) with new pattern generated in step e) if q>1 or if $\xi$<q where $\xi$ is a uniform pseudo-random number between 0 and 1, otherwise, reject the new pattern and retain the pattern $P_{mid}$;

h) repeating steps e) through g) a sufficient number of times;

i) decreasing T to kT where k<1 and repeating steps e) through h) until the cost of successive decreases in T are no longer changing.

j) substitute $P_{mid}$ for $P_{inf}$ and repeat steps a) through i);

k) substitute $P_{mid}$ for $P_{sup}$ and repeat steps a) through i);

l) repeat steps j) and k) with the $P_{mid}$ that results from steps j) and k);

m) repeat steps l) until all desired density levels are formed.

B) providing a pixel value representing the density level of a digital image.

C) for each pixel value of the digital image, modularly selecting a portion of the binary bit pattern from the corresponding pattern of the same density level form the set of binary bit patterns by addressing the bit pattern with the lower significant bits of an (x,y) pixel address associated with each pixel to select a lot and employing the selected bit to form a halftone image.

2. The method claimed in claim 1 wherein the bit patterns are the same resolution as the digital image, and the selected portion of the bit pattern is one bit.

3. The method claimed in claim 1 wherein the bit patterns are of higher resolution than the digital image, and the selected portion of the bit pattern is a block of bits.

4. The method claimed in claim 1 wherein the bit patterns are 32×32 bits.

* * * * *